(No Model.) 2 Sheets—Sheet 1.

J. CUSTER.
SEEDER.

No. 567,780. Patented Sept. 15, 1896.

Witnesses.

Inventor
Joseph Custer
By John Wedderburn
his Atty.

(No Model.) 2 Sheets—Sheet 2.

J. CUSTER
SEEDER.

No. 567,780. Patented Sept. 15, 1896.

Witnesses.
J. F. Coleman
K. A. Nau

Inventor
Joseph Custer
By John Wedderburn
his Atty.

UNITED STATES PATENT OFFICE.

JOSEPH CUSTER, OF GOSHEN, OHIO.

SEEDER.

SPECIFICATION forming part of Letters Patent No. 567,780, dated September 15, 1896.

Application filed May 22, 1896. Serial No. 592,602. (No model.)

*To all whom it may concern:*

Be it known that I, JOSEPH CUSTER, a citizen of the United States, residing at Goshen, in the county of Clermont and State of Ohio, have invented certain new and useful Improvements in Seeders; and I do hereby declare the following to be a full, clear, and exact description of the invention, such as will enable others skilled in the art to which it appertains to make and use the same.

In United States Patent No. 223,320, granted to me January 6, 1880, there is shown and described a seed-planter in which is employed a feed-hopper loosely mounted upon a shaft to which are secured two horizontally-disposed disks which have a series of registering openings therethrough, an interposed cutting-blade, and an adjustable plate on the under side of the lower disk for regulating the depth of the openings therein and the size in which the potatoes or other seed-containing vegetable is cut. The potatoes are fed into the top of the hopper and upon the rotation of the shaft extending therethrough are fed at regular intervals through the openings in the perforated disks and dropped upon the ground. In actual use certain objections have been found in the planter referred to, to wit, the scraping and peeling of the potatoes and the difficulty of rotating the shaft by reason of the great weight which rests upon the upper disk.

My present invention is designed as an improvement upon that disclosed in the former patent referred to; and it consists, essentially, of forming the upper of said perforated disks with an annular flange projecting upward from its outer periphery and of an improved seed-receptacle to be attached to the upper end of the seed-hopper, the bottom of said receptacle being rigidly secured thereto and provided with an opening or recess at one point therein and the receptacle itself divided off by partitions and rotatably mounted on a central shaft or spindle.

It also consists in other details of construction and combinations of parts, which will be hereinafter more fully described and claimed.

Figure 1:
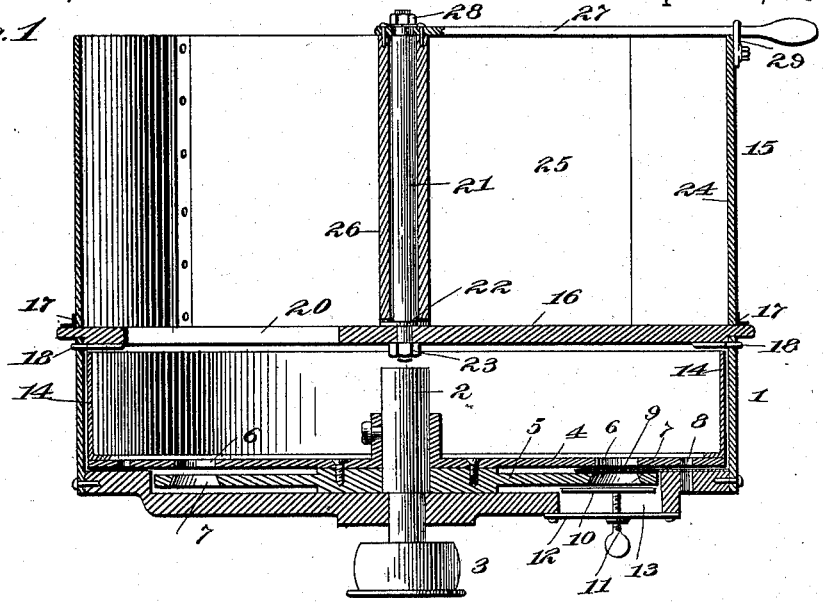
Figure 2:
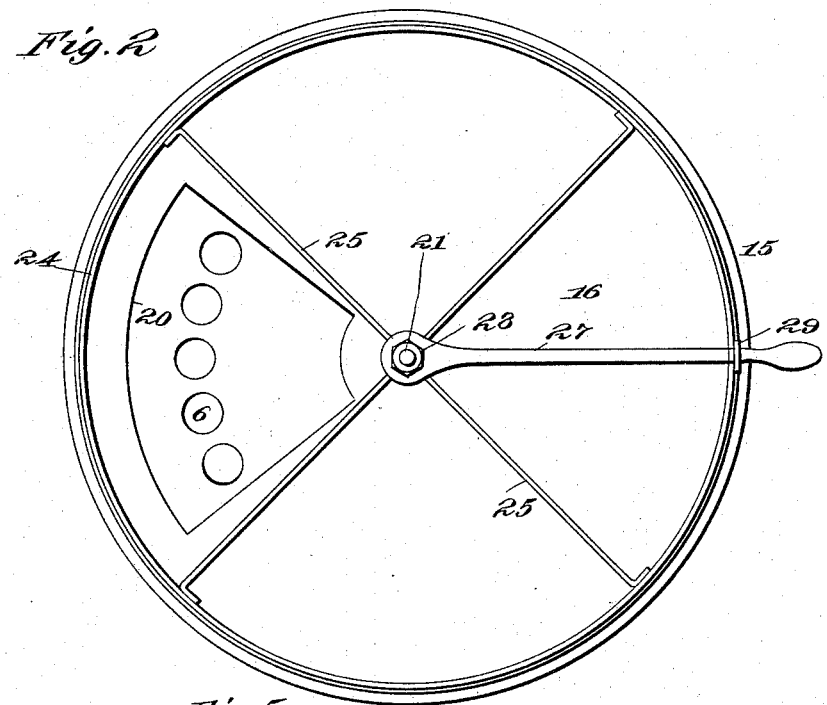
Figure 5:
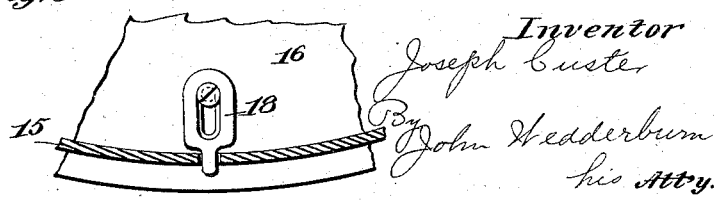
Figure 3:
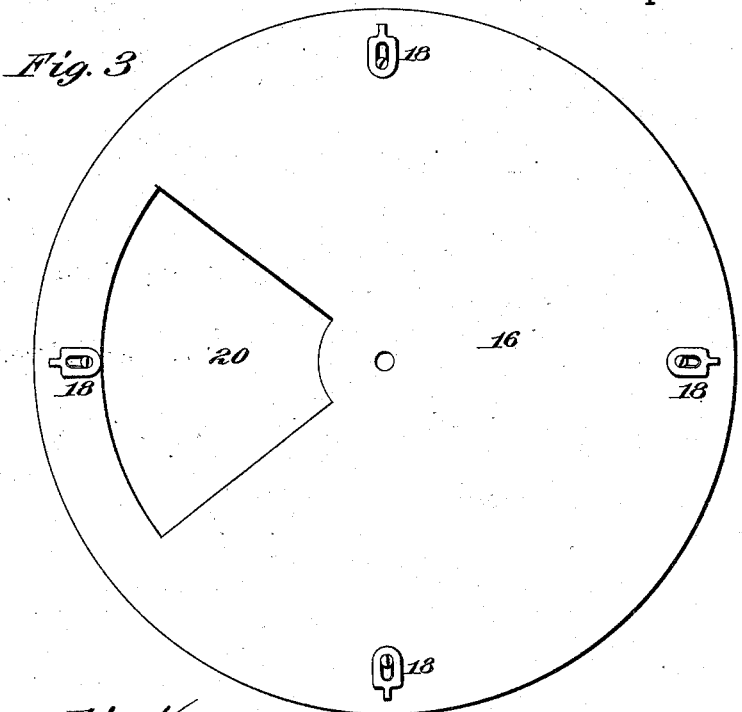
Figure 4:
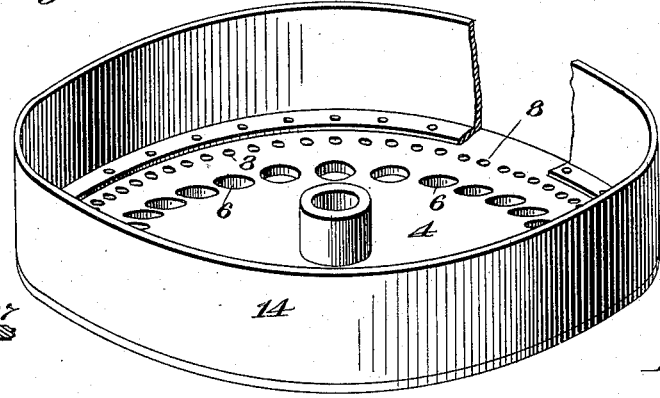
Figure 6:
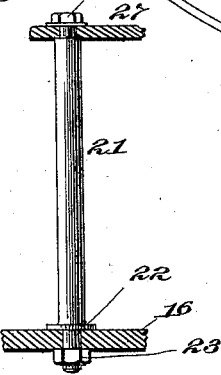
Figure 7:
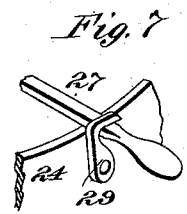

In the drawings forming part of this specification, Figure 1 represents a vertical central sectional view through a seed-planter with my improvements applied thereto. Fig. 2 is a plan view of the same. Fig. 3 is a bottom plan view of the bottom of the seed-receptacle. Fig. 4 is a detail perspective view, partly broken away, of the upper perforated disk, showing the annular flange upon its outer edge. Fig. 5 is a detail view showing the connection between the bottom of the seed-receptacle and the sides of the seed-hopper. Fig. 6 is a sectional detail view of a supplemental spindle, showing its operative handle and the means of connecting the same with the bottom of the seed-receptacle. Fig. 7 is a detail view showing the connection between said lever and the sides of said seed-receptacle.

Like reference-numerals indicate like parts in the different views.

My improved planter consists of a seed-hopper 1, loosely mounted upon a shaft 2, which passes centrally therethrough, a pulley 3, secured to said shaft, through which motion is transmitted for rotating the shaft, and a pair of disks 4 5, secured to said shaft, adapted to be rotated therewith and moving within said hopper 1. The disks 4 5 are each provided with a circular row of perforations 6 7, through which the potatoes or other seed fall to the ground through an opening in the bottom of the hopper. The disk 4 is of larger diameter than the disk 5 and is provided with a second series of openings 8 8 at points near its outer end, through which small seed may pass when that kind of seed is used in the machine. Secured to a shoulder in the hopper 1 is a cutting-blade 9, which projects inwardly between the two disks 4 and 5 and serves the function of cutting the potatoes into small pieces as they are fed into the openings 6 7 in the disks 4 5. Located beneath the disk 5 is a plate 10, which is supported upon the upper end of a thumb-screw 11, which passes through the bar 12, extending across the opening 13 in the under side of the hopper 1. This plate is provided for the purpose of regulating the size into which the potatoes are to be cut.

The device as described thus far is substantially what is shown in my prior patent above referred to. My present improvements consist in forming the upper disk 4 with an upwardly-extending annular flange 14, which prevents the potatoes fed into the hopper 1 from coming in contact with the stationary part of said hopper and bruising or skinning the same. In connection with the foregoing I employ a seed-receptacle 15, located upon the top of the hopper 1. This receptacle is made up of a bottom 16, centrally perforated for the passage of the shaft 2 therethrough, formed with flanges or projections 17 upon its upper outer edge, and provided with latches 18 on its under surface, which are adapted to be thrown outwardly into engagement with slots or perforations in the upper edge of the hopper 1. By this means the bottom 16 is securely held in position on the top of the hopper 1. The said bottom is further provided with an opening or cut-away portion 20 at one point, as clearly shown in Figs. 2 and 3. Extending upwardly from the bottom 16 is a spindle 21, having a shoulder 22 near its lower end, which rests upon the bottom 16 and is held in close relation thereto by means of a nut 23 on the lower end thereof. Fitting upon the top of the bottom 16 and resting within the flanges or projections 17 thereon are the cylindrical sides 24 of the seed-receptacle. This receptacle is divided up into sections by means of partitions 25 25, which are connected to the inner side of the receptacle 24 and to a sleeve or tube 26, surrounding the spindle 21, heretofore described. Resting upon the top of the sleeve 26 is a handle or lever 27, which surrounds loosely an extension of the spindle 21 and is held in place thereon by means of a nut 28. This lever 27 is adapted to engage hooks or projections 29 upon the upper edge of the sides 24, for the purpose of turning the latter to bring one or the other of the compartments in which said receptacle is divided by the partitions 25 over the opening 20 in the bottom 16 to feed the contents of each of said compartments separately through to the disks 4 5 of the hopper 1.

By the use of my improvements it will be seen that all rubbing or skinning of the potatoes contained in the hopper 1 against the stationary parts of said hopper is avoided by forming an annular flange upon the outer edge of the disk 4. Furthermore, by the use of the seed-receptacle located upon the top of the hopper 1 I am enabled to keep the main part of the seeds out of the hopper 1, which, under the old construction, caused the moving parts to work with great friction.

While I have described my invention in its preferred form, it is obvious that many modifications might be resorted to and minor changes made therein without departing from the nature and spirit of the invention. Such modifications and changes are clearly within the scope of my invention and are intended to be covered by this patent.

Having now described my invention, what I claim as new, and desire to secure by Letters Patent, is—

1. In a seed-planter of the character described, the combination of a hopper loosely mounted upon a shaft passing centrally therethrough, a pair of perforated disks secured to said shaft and moving in said hopper, the upper of said disks being provided with an annular flange projecting upwardly from its outer edge, substantially as and for the purpose described.

2. The combination with a seed-hopper provided with means for feeding the seed therethrough, of a seed-receptacle fitting the upper end of said hopper, the same consisting of a bottom having an opening or cut-away portion therein secured firmly to the top of said hopper, a cylinder resting upon the top of said bottom, partitions dividing said cylinder up into compartments, and means for rotating said cylinder, substantially as and for the purpose described.

3. The combination with the feed-hopper of a seed-planter of the character described and means for feeding the seed therefrom, of a seed-receptacle, consisting of a bottom having an opening or cut-away portion at one point therein, the said bottom being securely connected to the upper end of said hopper, a shaft or spindle secured to said bottom and rising upwardly from the central portion thereof, a cylinder resting upon said bottom and moving between guides on the outer edge thereof, a sleeve or tube surrounding said spindle, partitions connecting said sleeve or tube with the inner surface of said cylinder and a lever fulcrumed in said spindle and adapted to engage hooks or projections on the upper surface of said cylinder, substantially as and for the purpose described.

In testimony whereof I have signed this specification in the presence of two subscribing witnesses.

JOSEPH CUSTER.

Witnesses:
F. C. LAYCOCK,
ALICE LAYCOCK.